(12) United States Patent
Frenzel et al.

(10) Patent No.: US 7,860,155 B2
(45) Date of Patent: Dec. 28, 2010

(54) DATA TRANSMISSION DEVICE

(75) Inventors: Rudi Frenzel, Munich (DE); Friedrich Geissler, Wolfratshausen (DE); Ulrich Huewels, Starnberg (DE)

(73) Assignee: Lantiq Deutschland GmbH, Neubiberg (DE)

( * ) Notice: Subject to any disclaimer, the term of this patent is extended or adjusted under 35 U.S.C. 154(b) by 911 days.

(21) Appl. No.: 11/786,755

(22) Filed: Apr. 12, 2007

(65) Prior Publication Data

US 2008/0008232 A1   Jan. 10, 2008

(30) Foreign Application Priority Data

Apr. 12, 2006   (DE) .................. 10 2006 017 245

(51) Int. Cl.
*H04B 1/38* (2006.01)
*H04L 5/16* (2006.01)
(52) U.S. Cl. ................ 375/222; 375/220; 375/260; 375/295

(58) Field of Classification Search ................. 375/222, 375/220, 260, 295
See application file for complete search history.

(56) References Cited

U.S. PATENT DOCUMENTS

| 6,442,173 | B1 | 8/2002 | Barsoum et al. |
| 6,889,385 | B1* | 5/2005 | Rakib et al. ................. 725/119 |
| 7,020,101 | B2* | 3/2006 | Mantilo ....................... 370/295 |
| 7,158,563 | B2 | 1/2007 | Ginis et al. |
| 2002/0091861 | A1 | 7/2002 | Kim et al. |
| 2006/0092858 | A1 | 5/2006 | Kynast et al. |
| 2007/0081582 | A1 | 4/2007 | Ginis et al. |

OTHER PUBLICATIONS

Frank, E.H., et al., "Connecting the Home with a Phone Line Network Chip Set," IEEE Micro, vol. 20, No. 2, Apr.-Mar. 2000, pp. 27-38.

* cited by examiner

*Primary Examiner*—Ted M Wang
(74) *Attorney, Agent, or Firm*—Slater & Matsil, L.L.P.

(57) ABSTRACT

A data transmission device for transmitting data between a subscriber line and a local line-connected data transmission network is described.

22 Claims, 2 Drawing Sheets

DATA TRANSMISSION DEVICE

This application claims priority to German Patent Application 10 2006 017 245.0, which was filed Apr. 12, 2006, and is incorporated herein by reference.

BACKGROUND

The present invention relates to a data transmission device for transmitting data between a subscriber line and a local line-connected data transmission network.

BRIEF DESCRIPTION OF THE DRAWINGS

Hereinafter, exemplary embodiments of the invention will be described with reference to the drawings.

DETAILED DESCRIPTION OF ILLUSTRATIVE EMBODIMENTS

Figure 1:
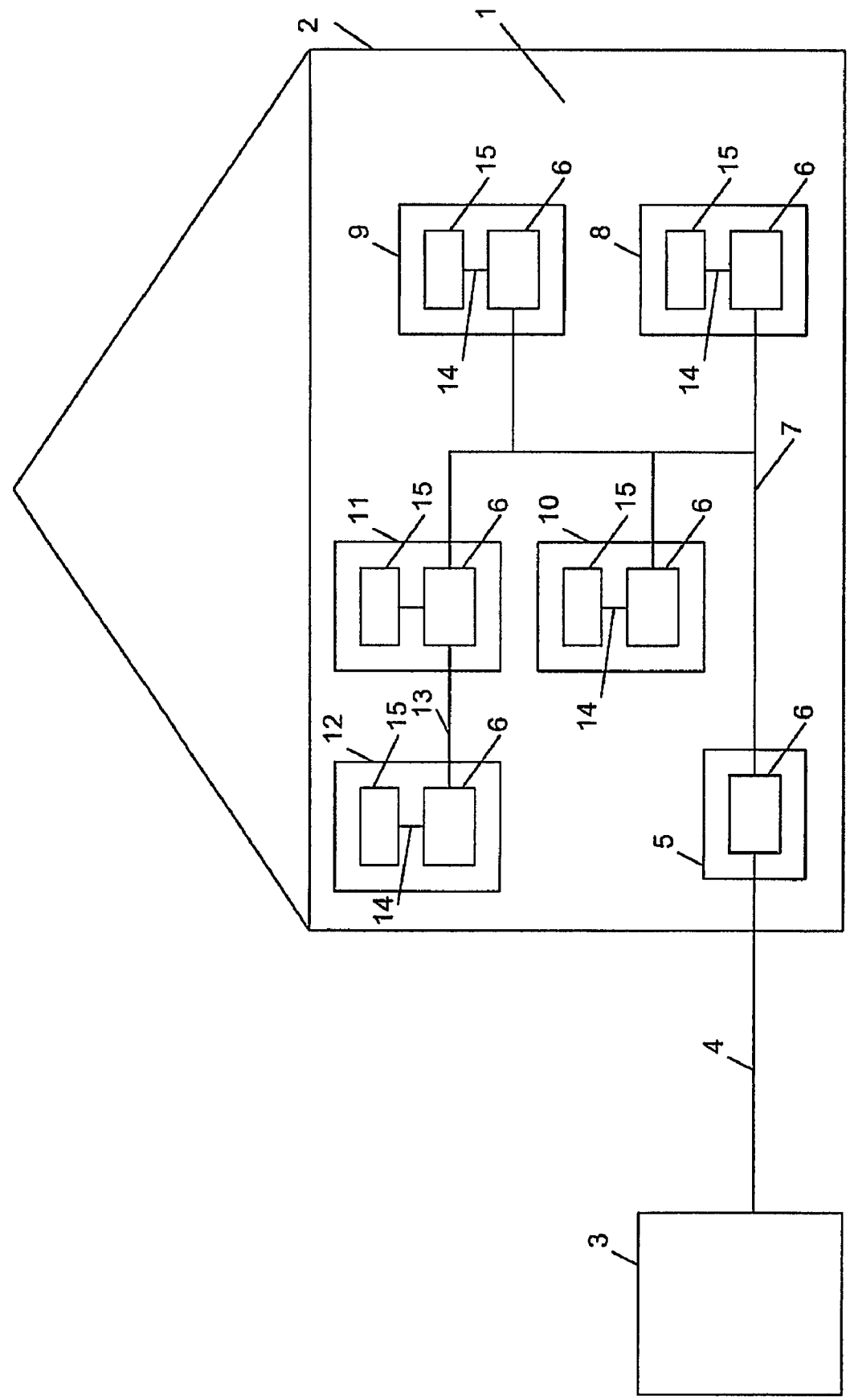
FIG. 1 is a schematic illustration of a system according to the invention for data transmission.

According to an embodiment, a data transmission device for transmitting data between a subscriber line and a local line-connected data transmission network is provided, the data transmission device comprising a first modulator for modulating the data to be transmitted via the subscriber line, a first demodulator for demodulating the data transmitted via the subscriber line, a second modulator for modulating the data to be transmitted via the local data transmission network using a DMT (discrete multitone transmission) modulation method, and a second demodulator for demodulating the data transmitted via the local data transmission network using a DMT modulation method.

Very high data transmission rates and high transmission quality can be achieved as a result of the use of a DMT modulation method on the local data transmission network consisting of the existing and, if appropriate, extended infrastructure of the domestic field or a small company.

According to an embodiment, the data to be transmitted via the subscriber line is also modulated or demodulated using a DMT modulation method. The use of the DMT modulation method both in the local data transmission network and on the subscriber line simplifies the conversion of the data from the subscriber line to the local data transmission network and vice versa, thus reducing the costs of a corresponding data transmission device.

The data transmission device can also comprise means for determining electrical properties of the local data transmission network. These can, for example, be properties concerning noise level, line attenuation, frequency-dependent reflections, and crosstalk. On the basis of these determined properties, the data transmission device can, for example, adapt the DMT modulation method used on the local data transmission network so as to achieve an optimally high transmission bandwidth and optimally high transmission quality on the local data transmission network. In this case, the data transmission device can, for example, vary the number of frequencies used for the DMT modulation method and/or adjust the level per frequency. Adjustments of this type can be tracked continuously in order, for example, to respond to changes in topology within the local data transmission network and thus to ensure optimum data transmission in all cases. Moreover, on the basis of the determined electrical properties of the local data network, the data transmission device can adjust the receive filters of the DMT demodulator accordingly, allowing an optimally high data transmission rate to be achieved. Finally, the data transmission device may comprise means or a circuit for transmitting the measured electrical properties of the local data transmission network to an exchange via the subscriber line. This allows, for example, a service engineer to analyze transmission problems within the local data transmission network without actually being on site.

In addition, the data transmission device may comprise means or a circuit for supplying a terminal to be connected to the local data transmission network with electrical power via the local data transmission network. This allows terminals having, for example, low power consumption to be powered without having their own power supply, exclusively by way of the electrical power transmitted via the local data transmission network. This may reduce the costs of a terminal of this type, for example a telephone.

In a further embodiment, the data transmission device comprises means or a circuit for encrypting and decrypting the data to be transmitted via the local data transmission network. This can both increase the protection from tapping of the data to be transmitted via the local data transmission network and meet the requirements of service providers wishing, for example, to prevent recording of the transmission of specific items of data provided by them, as these items of data were transmitted, for example, merely for single use. Encryption and decryption of the data to be transmitted via the local data transmission network can thus support digital right management (DRM).

According to another embodiment, the data transmission device is configured in such a way that the components of the data transmission device are arranged on a single chip. This allows various functional groups required for modulating or demodulating using the DMT modulation method to be used both for the transmission of data on the subscriber line and for the transmission of data on the local data transmission network. This allows the costs of a data transmission device of this type to be further reduced.

According to still another embodiment, the data transmission device comprises an interface at which data is transmitted in non-modulated form. An interface of this type allows the data transmission device to be used as an interface module in a terminal, the data transmission device modulating or demodulating the data to be transmitted on the local data transmission network and supplying this data to the terminal in non-modulated form via this interface. This provides an inexpensive interface module for use in a terminal to be connected to the local data transmission network.

According to an embodiment, a network terminating device for coupling a local data transmission network to a subscriber line, and the above-mentioned terminal are provided. The network terminating device comprises a data transmission device and can be electrically connected to the subscriber line and the local data transmission network. The terminal also comprises a data transmission device and can be electrically connected to the local data transmission network. Using the data transmission device both in the network terminating device and in the terminal eliminates the need to develop a differing data transmission device for a terminal and for a network terminating device can be avoided, thus reducing the costs of a uniform data transmission device.

According to another embodiment, a system for transmitting data is provided. The system for transmitting data consists of the subscriber line, the network terminating device, the local data transmission network and at least one terminal. The network terminating device is electrically connected to the subscriber line and the local data transmission network. The at least one terminal is electrically connected to the local data transmission network. The local data transmission network can comprise connecting lines configured as a twisted pair cable and/or connecting lines configured as coaxial lines. The fact that the data transmission devices used in the system are suitable for transmitting data both via coaxial lines and via twisted pair cables means that the lines, present in the domestic field or in small companies, of the existing communication infrastructure are used for the transmission of data, thus saving high rewiring costs.

Another embodiment provides a method for transmitting data between a subscriber line and a terminal. The data transmitted from an exchange via the subscriber line is, in this case, received and demodulated and then modulated using a DMT modulation method and transmitted to the terminal. Conversely, data is received from the terminal and demodulated using a DMT demodulation method and then modulated and transmitted to the exchange via the subscriber line. The data transmitted from the exchange via the subscriber line is preferably received by a network terminating device and demodulated and then transmitted by the network terminating device to the terminal via a local data transmission network using a DMT modulation method and, conversely, the data from the terminal is received by the network terminating device via the local data transmission network and demodulated using a DMT demodulation method and then modulated by the network terminating device and transmitted to the exchange via the subscriber line. Using the DMT modulation method allows a high data transmission rate to be achieved on the local data transmission network while at the same time ensuring high transmission quality.

According to another embodiment, a method for transmitting data from a first terminal to a second terminal is provided. The data is transmitted in this case via a switching node. The data is accordingly modulated by the first terminal using a DMT modulation method and sent to the switching node. This data sent by the first terminal is received by the switching node and demodulated using a DMT demodulation method. The data received and demodulated from the first terminal is modulated by the switching node using a DMT modulation method and sent to a second terminal. The data modulated by the switching node is received by the second terminal and demodulated using a DMT demodulation method. Using the switching node ensures coordinated transmission of data between two terminals within the local data transmission network. Using the DMT modulation method ensures a high data transmission rate and high data transmission rate quality on the local data transmission network.

The method for transmitting data from a first terminal to a second terminal may also be configured in such a way that a network terminating device is operated as the switching node if the network terminating device, connected to the first and second terminal, is operable, and that a terminal is operated as the switching node if the network terminating device, connected to the first and second terminal, is not operable. This ensures that communication within the local data transmission network is possible even in the event of the failure of the network terminating device.

FIG. 1 shows a system for a data transmission 1 in the domestic field or a small company 2. The system for data transmission is connected to an exchange 3 of a public communications and data network via a subscriber line 4. A network terminating device 5 of the system for data transmission 1 comprises a data transmission device 6. A first modulator and a first demodulator of the data transmission device 6 of the network terminating device 5 are connected to the subscriber line 4. A second modulator and a second demodulator of the data transmission device 6 of the network terminating device 5 are connected to a local data transmission network 7. The local data transmission network 7 is connected to further data transmission devices 6 arranged in terminals 8 to 12, with terminal 12 being connected through terminal 11 as discussed below.

The data on the subscriber line 4 can be transmitted using any desired modulation method, such as, for example, ISDN (integrated services digital network) or DSL (digital subscriber line), but preferably using a DMT (discrete multitone transmission) modulation method, such as, for example, DSL, as using a DMT modulation method allows the data transmission device to be configured particularly cost-effectively both on the subscriber line and on the local data transmission network. On the local data transmission network, the DMT modulation can, for example, be an OFDM (orthogonal frequency division multiplex), i.e., a superior DMT modulated to relatively high frequencies, wherein another DMT method can be used on the subscriber line.

The network terminating device 5 is used, firstly, for transmitting data between the exchange 3 via the subscriber line 4 and between the terminals 8 to 12 via the local data transmission network 7 and, secondly, for transmitting data between the terminals 8 to 12 connected to the local data transmission network 7. During transmission between the exchange 3 a terminal 8 to 12, the data to be transmitted is modulated or demodulated on the subscriber line 4 of the network terminating device 5 using a modulation method, used on the subscriber line, of the network terminating device and modulated or demodulated by the network terminating device using the DMT modulation method and transmitted to the terminals 8 to 12 via the local data transmission network 7. During transmission from a first of the terminals 8 to 12 to a second of the terminals 8 to 12, the data is modulated by the first of the terminals 8 to 12 using a DMT modulation method and transmitted to the network terminating device 5 via the local data transmission network 7. The network terminating device 5 receives the data, demodulates the data using the DMT demodulation method and then modulates the data using the DMT modulation method in order to transmit it to the second of the terminals 8 to 12 via the local data transmission network 7. The second of the terminals 8 to 12 receives the data and demodulates the data using the DMT demodulation method. As the DMT modulation method can be optimized for each transmission between one of the terminals 8 to 12 and the network terminating device 5, the transmission between the first of the terminals 8 to 12 and the network terminating device 5 can be carried out using a parameterization of the DMT modulation method other than that used, for example, for transmission of data between the second of the terminals 8 to 12 and the network terminating device 5. The parameterization of the DMT modulation method will be described hereinafter. The fact that the data is transmitted from the first of the terminals 8 to 12 to the second of the terminals 8 to 12 via the network terminating device ensures high transmission bandwidth and transmission quality. The network terminating device 5 is also referred to as the switching node in this application.

In order to ensure transmission of data between the terminals 8 to 12 even in the event of failure of the network terminating device 5, use can be made of a method to transfer the function of the switching node to one of the terminals 8 to 12 in the event of failure of the network terminating device. This can be carried out, for example, by manual reconfiguring of the terminals 8 to 12 or by an automatic method in which one of the terminals 8 to 12 takes, after an arbitrarily chosen waiting time, the function of the switching node if no other of the terminals 8 to 12 has taken the function of the switching node within this waiting time.

The data transmission device 6 also allows two local transmission networks 7 and 13 to be coupled together. In this case, the data transmission device 6 in the terminal 11 transmits the data to be transmitted between a terminal 12, connected to the local data transmission network 13, and a terminal 8 to 11, connected to the local data transmission network 7, or an exchange 3 connected to the local data transmission network 7 via the network terminating device 5 and the subscriber line 4. The data of the local data transmission network 7 is, in this case, modulated or demodulated respectively using the DMT modulation method and transmitted from or to the local data transmission network 13 and modulated or demodulated using a DMT modulation method. It is therefore possible to couple together local data networks and thus to keep each individual local data network as small as possible in order to achieve an optimally high data transmission rate and optimally high data transmission quality on each of these local data networks 7, 13.

The local data transmission network 7, 13 can, for example, be made up of coaxial lines and/or twisted pair cables and have an annular, star-shaped or meshed topology or a combination thereof. As the DMT modulation method used for the transmission of data on the local data network 7, 13 can be adapted to the electrical properties of the local data transmission network, the local data transmission network can have both coaxial line portions and cable portions consisting of twisted pair cables.

Figure 2:
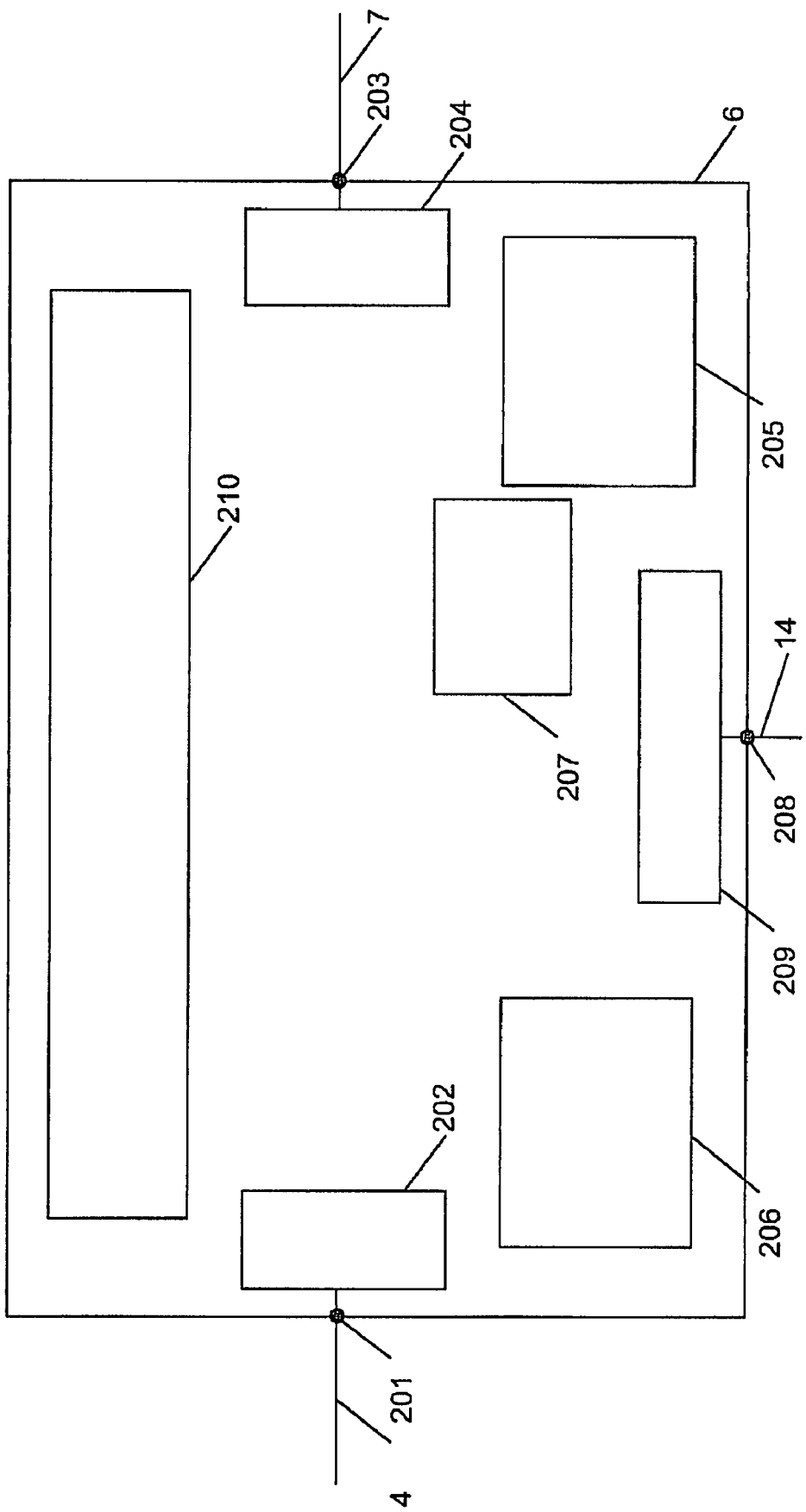
FIG. 2 is a schematic illustration of an embodiment of a data transmission device according to the present invention.

FIG. 2 shows schematically the construction of an embodiment of a data transmission device 6 according to an embodiment of the invention. The data transmission device 6 comprises a first connection 201 which is connected to a first modulator and demodulator 202 of the data transmission device 6 and can be connected, for example, to a subscriber line 4. The data transmission device 6 also comprises a second connection 203 which is connected to a second modulator and demodulator 204 of the data transmission device and can be connected, for example, to a local data transmission network 7.

The first modulator or demodulator 202 is configured in such a way as to modulate using a modulation method data to be transmitted on the subscriber line 4 or to demodulate modulated data which the data transmission device 6 receives from the subscriber line 4. The modulation method used on the subscriber line 4 can be any desired method, such as, for example, ISDN or DSL, but is preferably a DMT modulation method such as is used, for example, in DSL transmissions. The following description will assume that the first modulator and the first demodulator modulates or demodulates data using a DMT modulation method.

The second modulator and demodulator 204 is configured for modulating and demodulating data using a DMT modulation method. Data received at the first connection 201 is demodulated by the first demodulator 202 using a DMT demodulation method and then modulated by means of the second modulator 204 using a DMT modulation method and output to the second connection 203. Data received at the second connection 203 is demodulated by the second demodulator 204 using a DMT demodulation method and then modulated by the first modulator 202 using a DMT modulation method and output to the first connection 201.

A local data transmission network can have different electrical properties with regard to different communications paths within the data transmission network. The electrical properties of the data transmission network 7 shown in FIG. 1 with regard to transmission between the network terminating device 5 and the terminal 8 can thus, for example, differ from the transmission properties of the local data transmission network 7 with regard to transmission between the network terminating device 5 and the terminal 11. Various parameters of the DMT modulation method can be set in order to achieve optimum data transmission, i.e., an optimally high data transmission rate and optimally high transmission quality. This relates, for example, to the number of carrier frequencies used, to the frequency position of the carrier frequencies and to the level of the individual carrier frequencies. In order to allow optimum setting of these parameters of the DMT modulation method, the data transmission device 6 comprises means 205 for determining electrical properties of the local data transmission network 7 connected to the second connection 203.

The means for determining electrical properties 205 can, for example, determine the following properties:

level and frequency of noise and disturbances on the local data transmission network;

frequency-dependent attenuation properties of a connecting portion of the local data transmission network between the second connection 203 and a terminal;

frequency-dependent signal reflections occurring, in particular, as a result of bridge taps and transitions between coaxial lines and twisted pair cables; and near end crosstalk (NEXT) and far end crosstalk (FEXT) which can occur, in particular, owing to the complex topology and the bridge taps of the local data transmission network.

These established properties allow the DMT modulation method to be adjusted so as to allow optimum transmission of data between the network terminating device and one of the terminals 8 to 12. Continuously determining the electrical properties of the local data transmission network 7 allows optimum data transmission to be ensured even in the event of changes to the topology of the local data transmission network 7, failure of one of the terminals 8 to 12, or addition of a further terminal.

Moreover, the data transmission device 6 provides a circuit or means 206 which may transmit the electrical properties determined by the means 205 to an exchange 3 via the first connection 201 and a subscriber line 4 in accordance with a predetermined protocol. It is thus possible for a service engineer to obtain information concerning the electrical properties of the local data transmission network 7 in order, for example, to analyze data transmission problems within the data transmission network 7 without having to be on site.

The means 205 for determining electrical properties can, of course, also determine the electrical properties of a local data transmission network connected to the first connection 201 if the data transmission device 6 is used, as shown in FIG. 1, in a terminal 8 to 12. Finally, the demodulator 202, 204 can have adjustable digital receive filters which are adjusted on the basis of the electrical properties, determined by the means 205, of the connected local data transmission network.

The data transmission device 6 may also comprise a circuit or means for the encryption and decryption 207 of data, which means are suitable for encrypting or for decrypting data received or sent by the data transmission device. Use can be made, for example, of encryptions and decryptions using the RSA method or the triple DES method. The means 207 can also comprise authentication methods. Tapping-proof data transmission can thus be provided and ensured so that only authorized devices can be operated on the local data transmission network.

The data transmission device can also comprise a third connection 208 connected to an interface 209 of the data transmission device 6, wherein the data transmitted via the first connection 201 or second connection 203 can be transmitted in non-modulated form via the interface 209. This allows simple integration of the data transmission device 6 into a terminal 8 to 12 in that the data processing device 15, shown in FIG. 1, of the terminal is connected to the interface 209 via a link 14 and via the third connection 208. The data transmission device 6 is used in this case as an interface device within the terminal in order to connect the terminal to a local data transmission network on which the data is transmitted using a DMT modulation method.

Finally, the data transmission device 6 may comprise a control system 210 which controls and configures the components of the data transmission device 6. The control system 210 steers, for example, the flow of data between the first modulator and demodulator 202, the second modulator and demodulator 204 and the interface 209, activates or deactivates the means for encryption and decryption 207, actuates the means for determining electrical properties 205 and accordingly sets the parameters of the first and second modulators and demodulators 202, 204.

The data transmission device 6 can be arranged on a single chip. This allows various devices within the data transmission device to be commonly used both for the first modulator and demodulator 202 and for the second modulator and demodulator 204, provided that these devices are of digital configuration and have a sufficiently high processing speed to provide simultaneous processing of the signals of the first modulator and demodulator 202 and of the second modulator and demodulator 204.

This includes, for example:
  devices for calculating fast Fourier transforms and inverse fast Fourier transforms (FFT, iFFT),
  digital input filters and
  devices for digital line echo compensation (line echo cancellers, LEC).

The arrangement of the data transmission device 6 on a single chip also allows, for example, a memory for error-correcting processes of the DMT modulation method to be used both for the first demodulator 202 and for the second demodulator 204, so this memory requires a much smaller storage capacity than the sum of two separate memories for the first modulator 202 and the second modulator 204 respectively, as the common usage allows a statistical advantage of the memory utilization to be exploited.

What is claimed is:

1. A data transmission device for transmitting data between a subscriber line and a local line-connected data transmission network, the data transmission device comprising:
  a first modulator and/or a first demodulator for modulating or demodulating the data to be transmitted via the subscriber line;
  a second modulator and/or a second demodulator for modulating or demodulating the data to be transmitted via the local data transmission network using a DMT (discrete multitone transmission) modulation method;
  means for determining a group of electrical properties of a connecting line connected to a terminal of the local data transmission network; and
  a circuit for automatically adapting the DMT modulation method for transmitting data from and to the terminal in accordance with the group of electrical properties of the connecting line.

2. The data transmission device according to claim 1, wherein the data transmission device modulates or demodulates the data to be transmitted via the subscriber line using a DMT modulation method.

3. The data transmission device according to claim 1, wherein the electrical property of the local data transmission network comprises at least one parameter selected from the group consisting of:
  noise level;
  line attenuation between two respective endpoints of the local data transmission network;
  frequency-dependent reflections;
  near end crosstalk; and
  far end crosstalk.

4. The data transmission device according to claim 1, wherein the data transmission device comprises a circuit for transmitting the electrical property of the local data transmission network to an exchange via the subscriber line, the exchange being coupled to the data transmission device via the subscriber line.

5. The data transmission device according to claim 1, wherein the data transmission device comprises a circuit for supplying a terminal to be connected to the local data transmission network with electrical power via the local data transmission network.

6. The data transmission device according to claim 1, wherein the data transmission device comprises a circuit for encrypting and decrypting the data to be transmitted via the local data transmission network.

7. The data transmission device according to claim 1, wherein the data transmission device is arranged on a single chip.

8. The data transmission device according to claim 1, wherein the data transmission device comprises an interface for transmitting the data to be transmitted via the local data transmission network in non-modulated form.

9. A network terminating device for coupling a local data transmission network to a subscriber line, wherein the network terminating device is electrically connectable to the subscriber line and the local data transmission network, the network terminating device comprising a data transmission device for transmitting data between a subscriber line and a local line-connected data transmission network, wherein the data transmission device comprises:
  a first modulator and/or a first demodulator for modulating or demodulating the data to be transmitted via the subscriber line;
  a second modulator and/or a second demodulator for modulating or demodulating the data to be transmitted via the local data transmission network using a DMT (discrete multitone transmission) modulation method;
  means for determining a group of electrical properties of a connecting line connected to a terminal of the local data transmission network; and
  a circuit for automatically adapting the DMT modulation method for transmitting data from and to the terminal in accordance with the group of electrical properties of the connecting line.

10. A terminal, wherein the terminal is electrically connectable to a local data transmission network, the terminal comprising a data transmission device for transmitting data between a subscriber line and a local line-connected data transmission network, wherein the data transmission device comprises:
  a first modulator and/or a first demodulator for modulating or demodulating the data to be transmitted via the subscriber line;

a second modulator and/or a second demodulator for modulating or demodulating the data to be transmitted via the local data transmission network using a DMT (discrete multitone transmission) modulation method;

means for determining a group of electrical properties of a connecting line connected to a terminal of the local data transmission network; and a circuit for automatically adapting the DMT modulation method for transmitting data from and to the terminal in accordance with the group of electrical properties of the connecting line.

11. A system for transmitting data, comprising:

a subscriber line;

a local data transmission network;

a terminal comprising a data transmission device for transmitting data between a subscriber line and a local line-connected data transmission network, the data transmission device comprising a first modulator and/or a first demodulator for modulating or demodulating the data to be transmitted via the subscriber line, a second modulator and/or a second demodulator for modulating or demodulating the data to be transmitted via the local data transmission network using a DMT (discrete multitone transmission) modulation method, means for determining a group of electrical properties of a connecting line connected to a terminal of the local data transmission network, and a circuit for automatically adapting the DMT modulation method for transmitting data from and to the terminal in accordance with the group of electrical properties of the connecting line; and a network terminating device connected to the subscriber line and, via the local data transmission network, to the terminal, the network terminating device comprising a data transmission device for transmitting data between the subscriber line and the local line-connected data transmission network, the data transmission device comprising a first modulator and/or a first demodulator for modulating or demodulating the data to be transmitted via the subscriber line, a second modulator and/or a second demodulator for modulating or demodulating the data to be transmitted via the local data transmission network using a DMT modulation method, means for determining a group of electrical properties of a connecting line connected to a terminal of the local data transmission network, and a circuit for automatically adapting the DMT modulation method for transmitting data from and to the terminal in accordance with the group of electrical properties of the connecting line.

12. The system according to claim 11, wherein a plurality of terminals are connected to the network terminating device via the local data transmission network.

13. The system according to claim 11, wherein a connecting line of the local data transmission network comprises a twisted pair cable.

14. The system according to claim 11, wherein a connecting line of the local data transmission network comprises a coaxial line.

15. A method for transmitting data between a subscriber line and a terminal, the method comprising:

receiving data from the subscriber line;

demodulating the data received from the subscriber line;

modulating the demodulated data from the subscriber line using a DMT (discrete multitone transmission) modulation method;

transmitting the modulated data received from the subscriber line to the terminal;

receiving data from the terminal;

demodulating the data received from the terminal using a DMT (discrete multitone transmission) modulation method;

modulating the demodulated data received from the terminal; and transmitting the modulated data received from the terminal via the subscriber line;

wherein a group of electrical properties of a connecting line connected to a terminal of a local data transmission network is determined, and wherein the DMT modulation method is adapted for transmitting data from and to the terminal in accordance with the previously determined properties of the connecting line.

16. The method according to claim 15, wherein data of the subscriber line is modulated and/or demodulated using a DMT modulation method.

17. The method according to claim 15, wherein data of the subscriber line is received by a network terminating device and demodulated and then modulated by the network terminating device using a DMT modulation method and transmitted to the terminal via a local data transmission network, and wherein data from the terminal is received by the network terminating device via the local data transmission network and demodulated using a DMT demodulation method and then modulated by the network terminating device and transmitted via the subscriber line.

18. The method according to claim 15, wherein the group of electrical properties is transmitted to an exchange.

19. The method according to claim 15, wherein the data transmitted from and to a terminal comprise encrypted data.

20. A method for transmitting data from a first terminal to a second terminal, wherein the data is transmitted via a switching node, the method comprising modulating the data by the first terminal using a DMT (discrete multitone transmission) modulation method;

sending the modulated data from the first terminal to the switching node;

receiving the data sent by the first terminal at the switching node;

demodulating the received data by the switching node using a DMT demodulation method;

modulating the data received and demodulated from the first terminal by the switching node using a DMT modulation method;

sending the data modulated by the switching node to the second terminal;

receiving the data modulated by the switching node at the second terminal and demodulated using a DMT demodulation method;

operating a network terminating device connected to the first and second terminal as the switching node if the network terminating device is operable; and operating a terminal as the switching node if the network terminating device connected to the first and second terminal is not operable.

21. A data transmission device for transmitting data between a subscriber line and a local line-connected data transmission network, the data transmission device comprising:

a first modulator and/or a first demodulator for modulating or demodulating the data to be transmitted via the subscriber line;

a second modulator and/or a second demodulator for modulating or demodulating the data to be transmitted via the local data transmission network using a DMT (discrete multitone transmission) modulation method; and means for determining an electrical property of the local data transmission network, wherein the electrical property of the local data transmission network comprises at least one parameter selected from the group consisting of:

noise level, line attenuation between two respective endpoints of the local data transmission network, frequency-dependent reflections, near end crosstalk, and far end crosstalk.

22. A data transmission device for transmitting data between a subscriber line and a local line-connected data transmission network, the data transmission device comprising:

a first modulator and/or a first demodulator for modulating or demodulating the data to be transmitted via the subscriber line; and a second modulator and/or a second demodulator for modulating or demodulating the data to be transmitted via the local data transmission network using a DMT (discrete multitone transmission) modulation method;

means for determining an electrical property of the local data transmission network; and a circuit for transmitting the electrical property of the local data transmission network to an exchange via the subscriber line, the exchange being coupled to the data transmission device via the subscriber line.

* * * * *